(12) United States Patent
Kumakura (10) Patent No.: US 8,878,990 B2
(45) Date of Patent: Nov. 4, 2014

(54) IMAGE SIGNAL PROCESSING APPARATUS AND LIQUID CRYSTAL DISPLAY

(75) Inventor: Takeshi Kumakura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/119,216

(22) PCT Filed: May 22, 2012

(86) PCT No.: PCT/JP2012/063043
§ 371 (c)(1),
(2), (4) Date: Nov. 21, 2013

(87) PCT Pub. No.: WO2012/161188
PCT Pub. Date: Nov. 29, 2012

(65) Prior Publication Data
US 2014/0092302 A1    Apr. 3, 2014

(30) Foreign Application Priority Data
May 25, 2011    (JP) .................. 2011-117386

(51) Int. Cl.
| | |
|---|---|
| H04N 7/01 | (2006.01) |
| H04N 11/20 | (2006.01) |
| H04N 7/12 | (2006.01) |
| H04N 11/02 | (2006.01) |
| H04N 11/04 | (2006.01) |
| H04N 21/462 | (2011.01) |
| H04N 21/2343 | (2011.01) |
| H04N 21/4402 | (2011.01) |

(52) U.S. Cl.
CPC ............. *H04N 7/01* (2013.01); *H04N 21/4622* (2013.01); *H04N 21/2343* (2013.01); *H04N 21/44029* (2013.01)
USPC ........................ 348/441; 348/443; 375/240.21

(58) Field of Classification Search
CPC ............. H04N 7/12; H04N 7/14; H04N 7/15; H04N 21/440263; H04N 21/4342; H04N 21/23602; H04N 21/234363
See application file for complete search history.

(56) References Cited

U.S. PATENT DOCUMENTS

| | | | |
|---|---|---|---|
| 2010/0007787 A1* | 1/2010 | Yamashita | .................... 348/441 |
| 2010/0149412 A1* | 6/2010 | Yamashita | .................... 348/443 |
| 2011/0206130 A1* | 8/2011 | Koto et al. | ............... 375/240.21 |

FOREIGN PATENT DOCUMENTS

| | | |
|---|---|---|
| JP | 2009130639 A | 6/2009 |
| JP | 2009260550 A | 11/2009 |

OTHER PUBLICATIONS

International Search Report PCT/ISA/210 dated Jun. 19, 2012 for Application No. PCT/JP2012/063043.
Written Opinion PCT/ISA/237 for Application No. PCT/JP2012/063043 dated Jun. 19, 2012.

* cited by examiner

*Primary Examiner* — Jefferey Harold
*Assistant Examiner* — Sean Haiem
(74) *Attorney, Agent, or Firm* — Harness, Dickey & Pierce, P.L.C.

(57) ABSTRACT

An image signal processing apparatus, which is capable of receiving, as inputs, images transmitted in first and second formats, includes a determination circuit that determines the first and second formats on the basis of correlation among a plurality of pieces of pixel data input in parallel with one another from the first to n-th channels, and a mapping circuit that sorts the plurality of pieces of pixel data in accordance with the determination result obtained by the determination circuit. According to the aforementioned configuration, an image signal processing apparatus that can handle two formats that divide the original image into n images and transmit the n images on n channels can be realized.

8 Claims, 9 Drawing Sheets

TYPES OF SINGLE SCAN FORMAT (a)

IMAGE SIGNAL PROCESSING APPARATUS AND LIQUID CRYSTAL DISPLAY

TECHNICAL FIELD

The present invention relates to image technology.

BACKGROUND ART

The number of pixels of current high definition television broadcasting (so-called full HD (FHD) is horizontal 1920× vertical 1080 (so-called 2K1K). Image standards (super high vision SHV is one of them) with the number of pixels four times greater than the full HD (so-called 4K2K) or the number of pixels sixteen times greater than the full HD (so-called ultra high definition or 8K4K) have been proposed.

For example, as an ultra high definition image transmission format, a format that divides an original ultra-high-definition image (frame) into high-definition images in n areas (n is plural) and transmits the images on n channels (single-scan multi-display transmission format, hereinafter simply referred to as a single scan format) and a format that divides an original ultra-high-definition image into n images (n is plural) with definition lower than the original image (so-called skipped images in which pixels are skipped to interpolate one another) and transmits the images on n channels (block-scan single-display transmission format, hereinafter simply referred to as a block scan format) have been proposed (for example, see PTL 1 and 2).

CITATION LIST

Patent Literature

PTL 1: Japanese Unexamined Patent Application Publication No. 2009-260550
PTL 2: Japanese Unexamined Patent Application Publication No. 2009-130639

SUMMARY OF INVENTION

Technical Problem

As described above, the method of dividing image data is different in the block scan format and the single scan format. Thus, there is a problem that an image processing apparatus that corresponds to the block scan format is incapable of processing an image transmitted in the single scan format, and an image processing apparatus that corresponds to the single scan format is incapable of processing an image transmitted in the block scan format.

An object of the present invention is to propose an image processing apparatus that can handle two formats that divide an original image into n images and transmit the n images on n channels.

Solution to Problem

The present image signal processing apparatus is an image signal processing apparatus capable of receiving, as inputs, images transmitted in first and second formats, the first format being a format that divides an original image into n areas (n is an integer greater than or equal to 2) and transmits the n area images on first to n-th channels, and the second format being a format that divides an original image into n images (n is an integer greater than or equal to 2) with definition lower than the original image and transmits the n images on first to n-th channels, including: a determination circuit that determines the first and second formats on the basis of correlation among a plurality of pieces of pixel data input in parallel with one another (concurrently) from the first to n-th channels; and a mapping circuit that sorts the plurality of pieces of pixel data in accordance with the determination result obtained by the determination circuit.

Advantageous Effects of Invention

An image processing apparatus that can handle two formats that divide an original image into n images and transmit the n images on n channels can be realized.

DESCRIPTION OF EMBODIMENTS

First Embodiment

Figure 1:
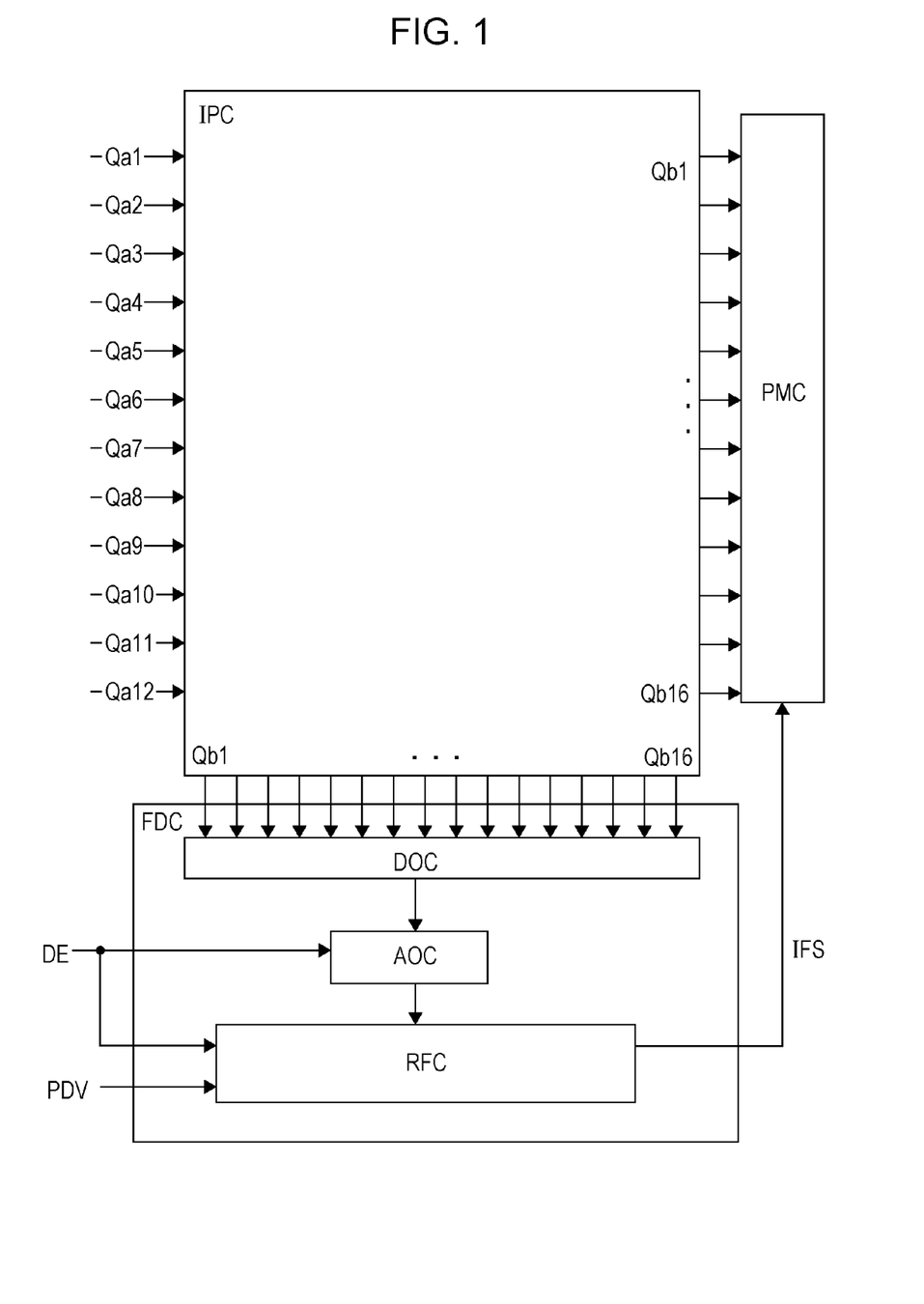
FIG. 1 is a schematic diagram illustrating an exemplary configuration of an image signal processing apparatus of a first embodiment.

An image signal processing apparatus of a first embodiment includes, as illustrated in FIG. 1, an input processing circuit IPC, a format determination circuit FDC, and a pixel mapping circuit PMC. The format determination circuit FDC includes a variance operation circuit DOC, a variance average operation circuit AOC, and a comparator circuit RFC.

Super high vision has the number of pixels sixteen times greater than a full HD (FHD) image, and pixel data Qa1 to Qa16 on sixteen channels, which are input image data, are input to the input processing circuit IPC in parallel with one another (concurrently). The input processing circuit IPC performs γ curve correction, color temperature correction, and color space conversion in order to perform panel display suitable for synchronization processing of data of individual pixels and for an input image standard, and outputs pixel data Qb1 to Qb16 to the pixel mapping circuit PMC and the format determination circuit FDC. The format determination circuit FDC determines the transmission format of the pixel data Qb1 to Qb16, and the pixel mapping circuit PMC, which has received the determination result, generates pixel data Qc1 to Qc16 by sorting the pixel data Qb1 to Qb16 in accordance with the input format of the image data and the driving format of the panel (pixel mapping).

Figure 3:
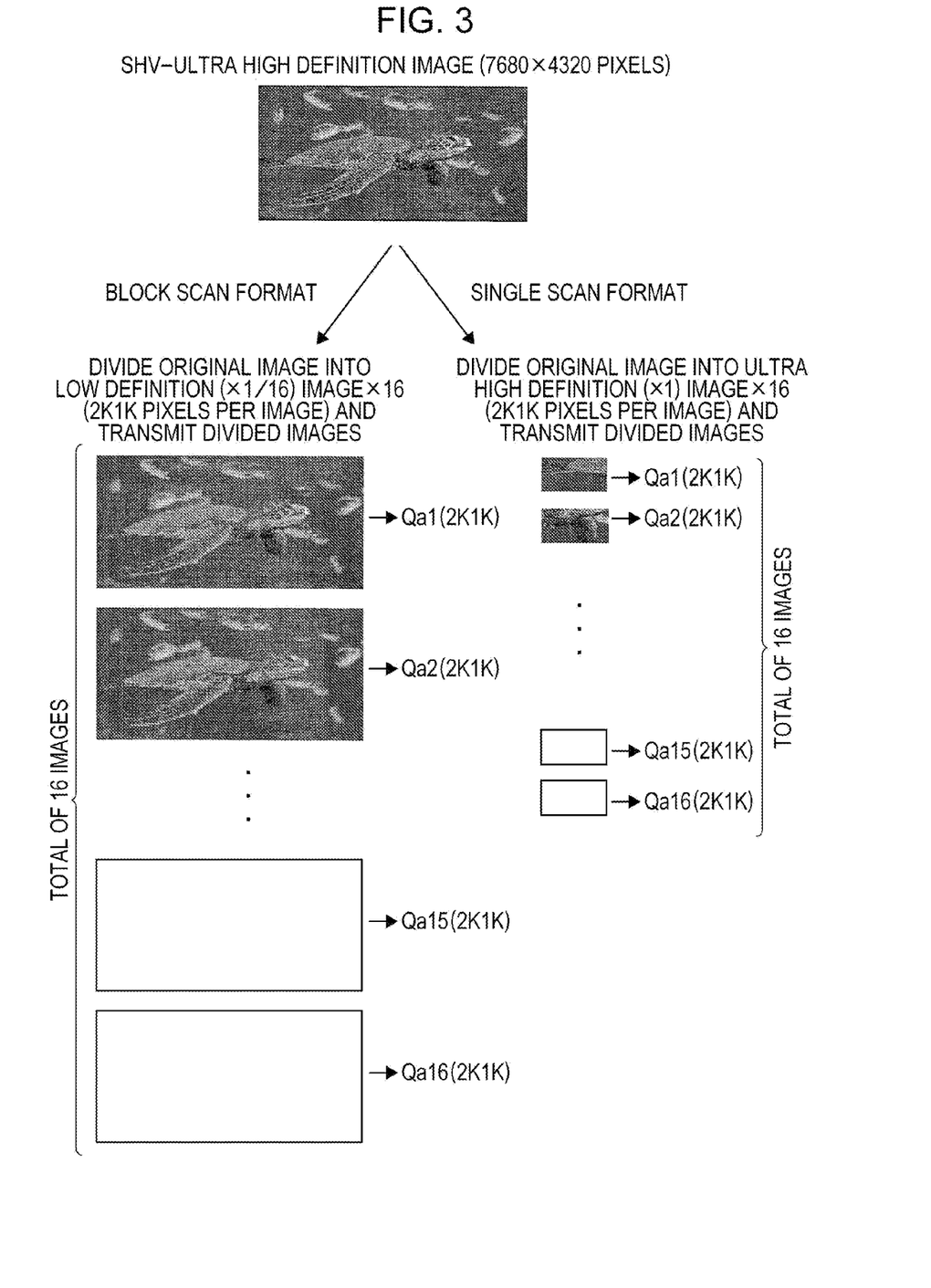
FIG. 3 is a schematic diagram explaining the difference between the single scan format and the block scan format.

Here, as the input (transmission) formats of super high vision image data, there are the single scan format (see FIG. 3) which divides an original image (frame) into images in sixteen areas without changing the definition and transmits the images on sixteen channels, and the block scan format (see FIG. 3) which divides an original image into sixteen images with definition that is one sixteenth of the original image (so-called skipped images in which pixels are skipped to interpolate one another) and transmits the sixteen images on n channels. Note that, in the block scan format, the entire image with the one sixteenth definition (in a state where pixels are skipped) can be viewed even with one channel.

Figure 2:
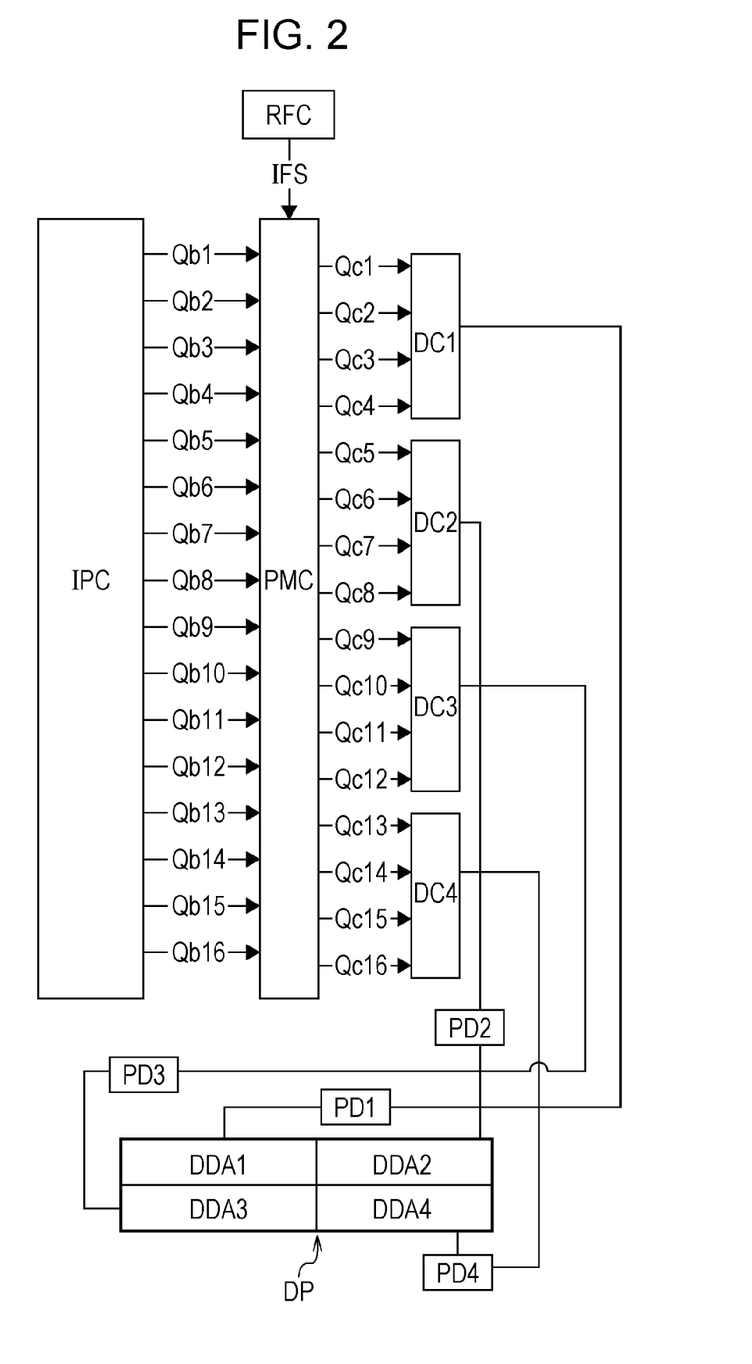
FIG. 2 is a schematic diagram illustrating an exemplary configuration of a display including the image signal processing apparatus of the first embodiment.

In addition, as illustrated in FIG. 2, on a display panel DP (8K4K) side, the entire screen is divided into four areas (divided display areas DDA1 to DDA4) at a size of 4K2K, and four panel driving circuits PD1 to PD4 drive the divided display areas DDA1 to DDA4, respectively. The panel driving circuits PD1 to PD4 are controlled by display control substrates DC1 to DC4, respectively. Note that the way the 8K4K panel is divided into four areas may be, besides the dividing format, as illustrated in FIG. 2, which divides the upper side into left and right two portions and the lower side into left and right two portions, for example, a format that divides the panel into four portions in the left and right direction regardless of the upper or lower side. For the 8K4K panel, there is also a format that divides the upper side into four portions in the left and right direction and the lower side into four portions in the left and right direction (eight dividing format, described later).

The pixel-mapped pixel data Qc1 to Qc4 (four channels, FHD pixels per channel) are input to the display control substrate DC1. The pixel-mapped pixel data Qc5 to Qc8 (four channels, FHD pixels per channel) are input to the display control substrate DC2. The pixel-mapped pixel data Qc9 to Qc12 (four channels, FHD pixels per channel) are input to the display control substrate DC3. The pixel-mapped pixel data Qc13 to Qc16 (four channels, FHD pixels per channel) are input to the display control substrate DC4.

Figure 4:
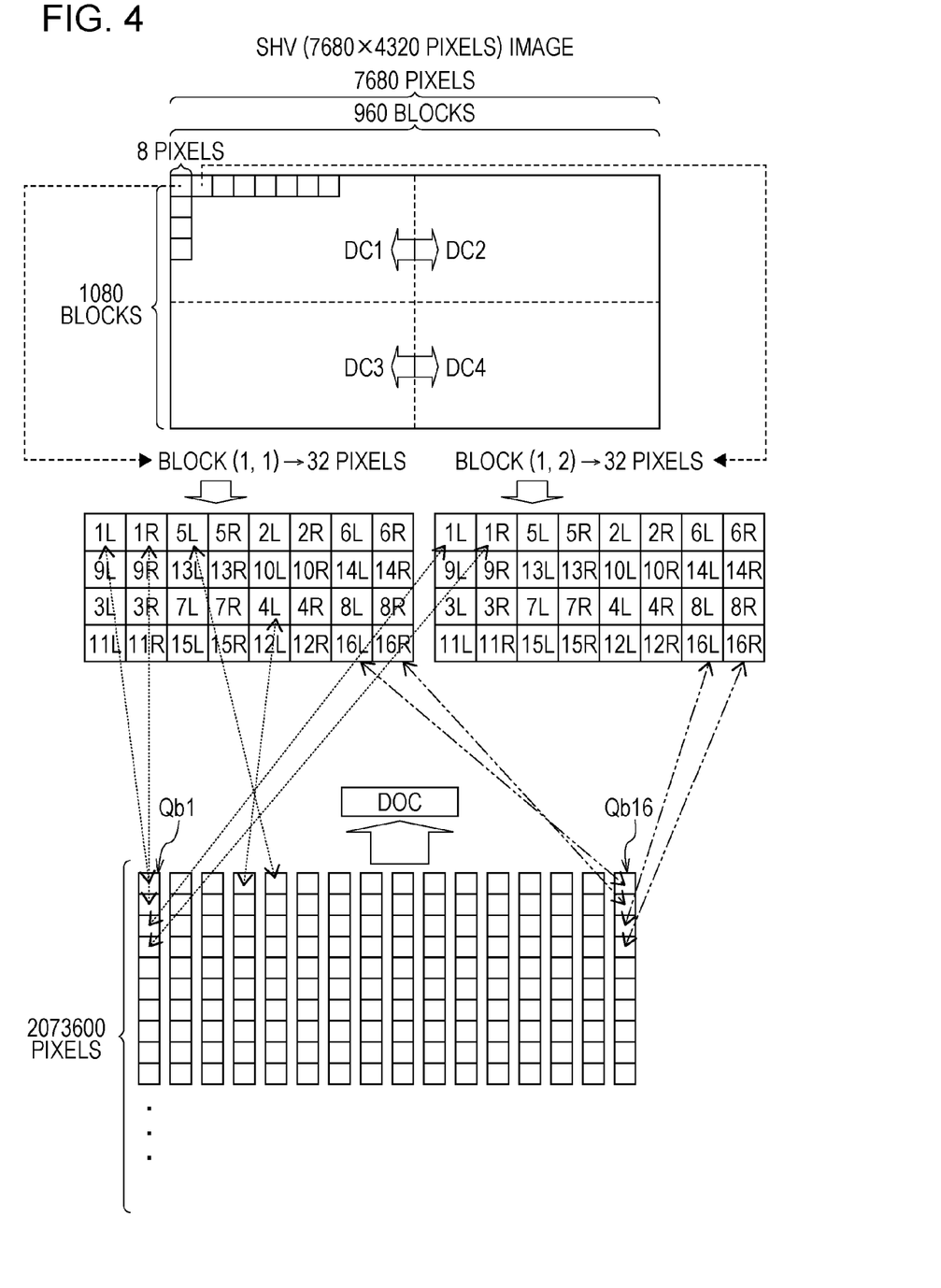
FIG. 4 is a schematic diagram illustrating a pixel mapping example in the block scan format.
Figure 5:
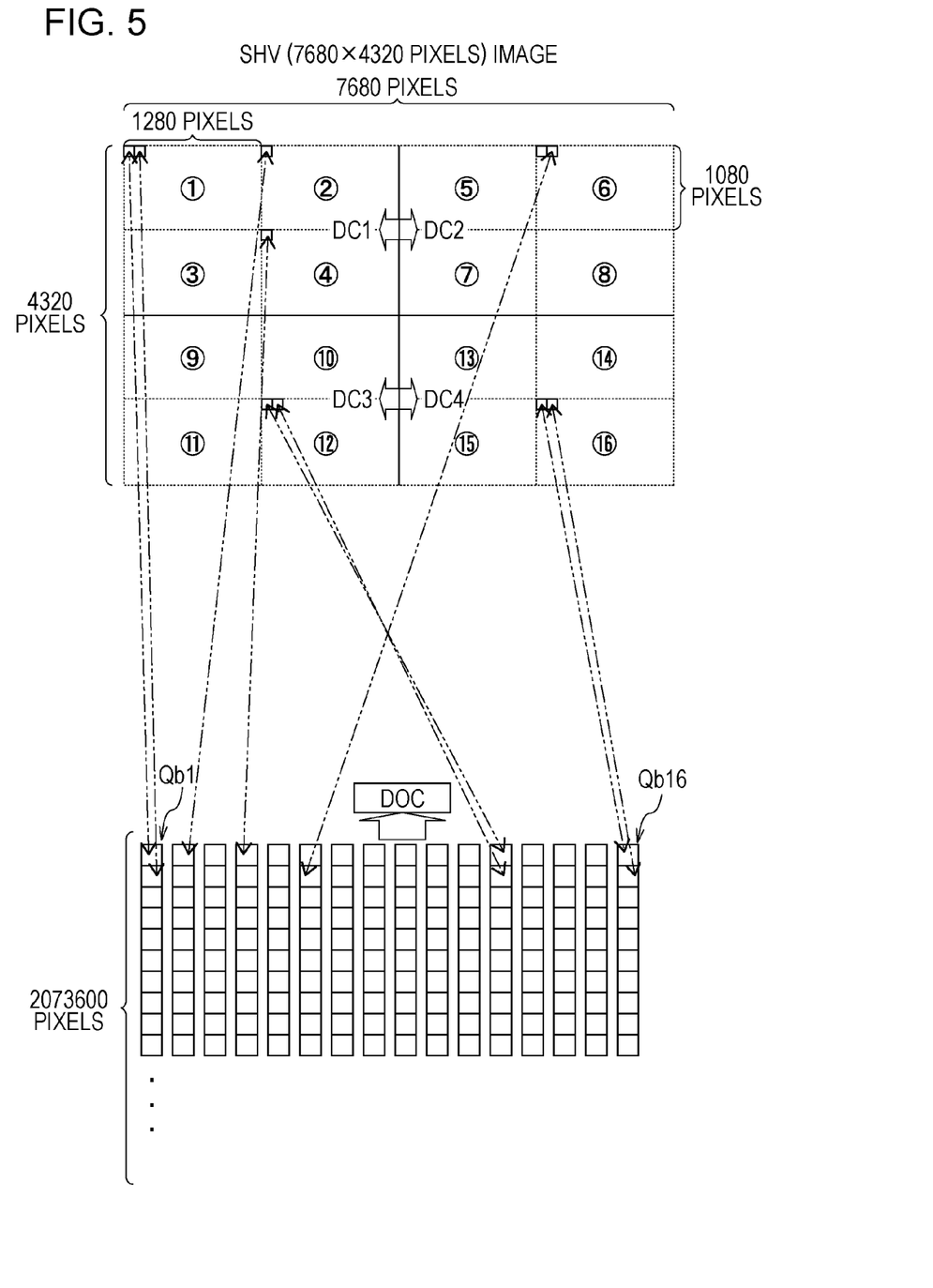
FIG. 5 is a schematic diagram illustrating a pixel mapping example in the single scan format.
Figure 6:
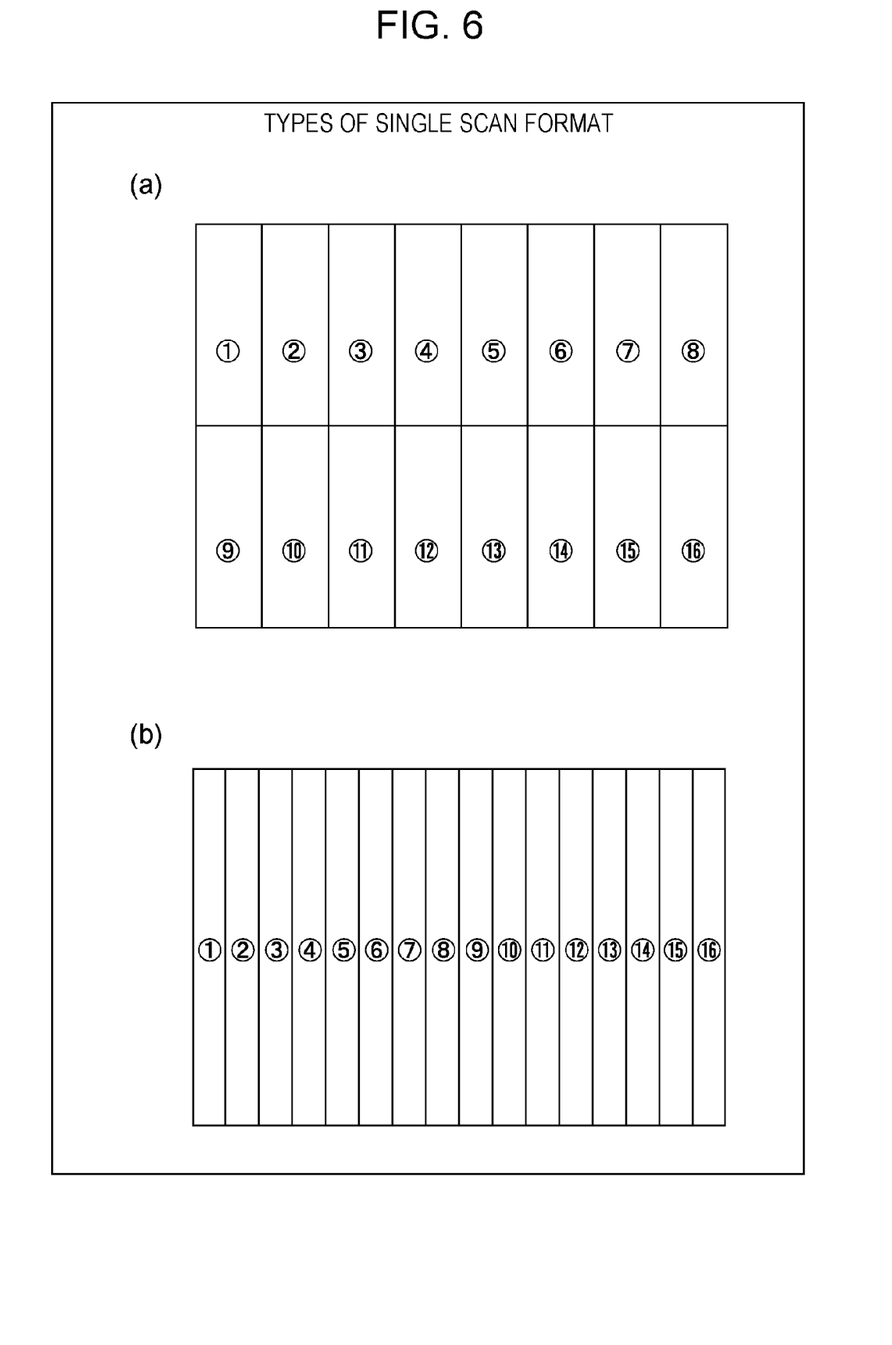
FIG. 6 includes schematic diagrams explaining other examples of area division in the single scan format.

As illustrated in FIG. 1, the pixel data Qb1 to Qb16 are input to the format determination circuit FDC, and a correlation value of the sixteen pieces of pixel data (such as luminance information or color information) that are input in parallel with one another is calculated. Here, as illustrated in FIG. 4, the sixteen pieces of pixel data serving as a set are concentrated in a certain area (the same block) in the screen in the block scan format, whereas, as illustrated in FIG. 5, the sixteen pieces of pixel data are spread out among different divided screens in the single scan format. Thus, the probability of pieces of pixel data (sixteen pieces of pixel data) included in one set being similar to one another is high in the block scan format, and this tendency is strong in the case of ultra high definition image. Meanwhile, there is a tendency that pieces of pixel data (sixteen pieces of pixel data) included in one set are not similar to one another (spread out) in the single scan format (the area division in the single scan format is not limited to the case in FIG. 5; for example, the cases in FIG. 6(a)(b) may be possible).

Figure 7:
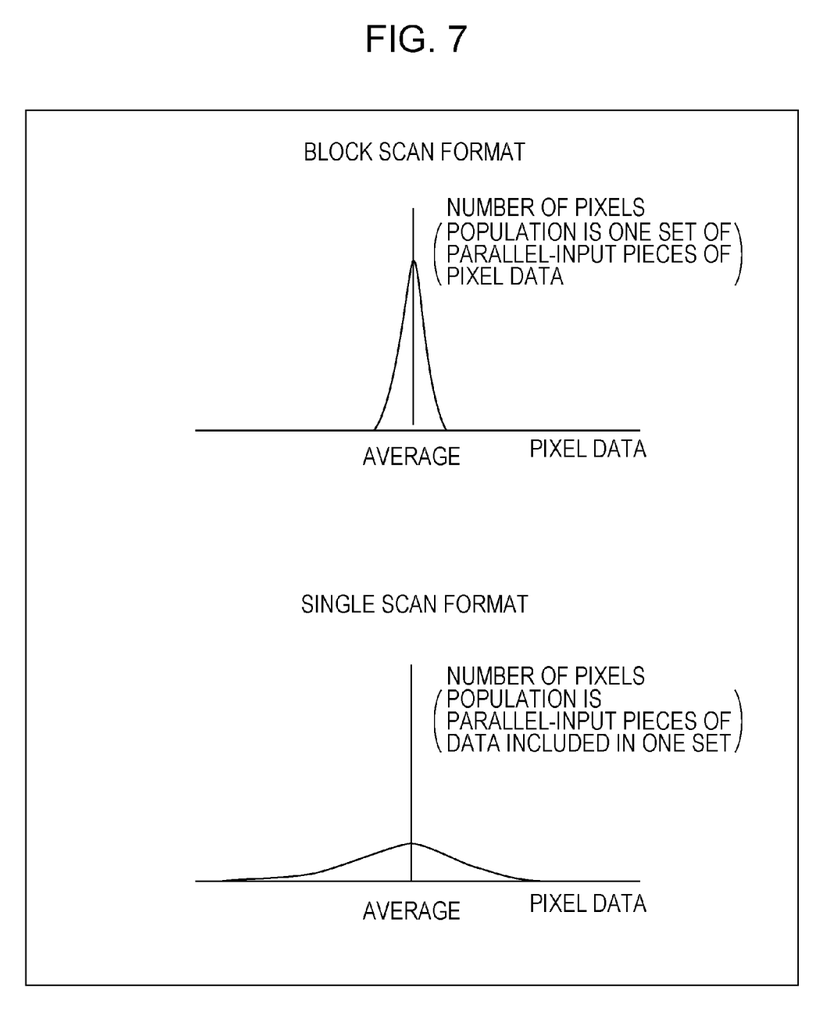
FIG. 7 is a schematic diagram explaining the relationship between pixel data and the number of pixels (population is a set of parallel-input pieces of pixel data) in the single scan format and the block scan format.

Therefore, in the case where the variance of a set of pieces of pixel data (sixteen pieces of pixel data) is taken and the average of variance values in a display period is taken, the variance average becomes small in the block scan format, whereas the variance average becomes great in the single scan format, as in FIG. 7. By determining whether the variance average is great or small, the input image format can be determined.

Figure 8:
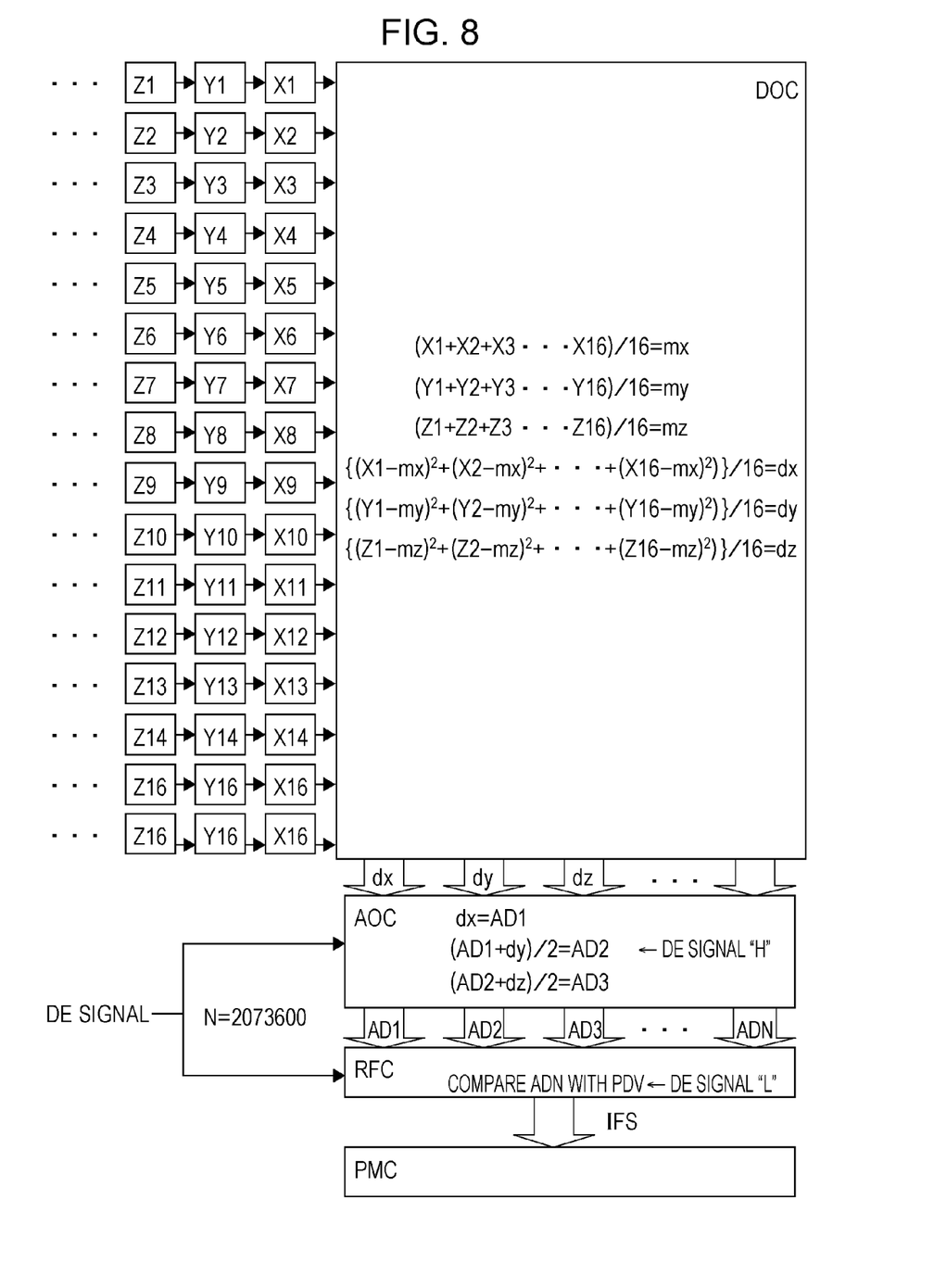
FIG. 8 is a schematic diagram illustrating the content of processing of the image signal processing apparatus of the first embodiment.

Specifically, as illustrated in FIG. 8, the variance operation circuit DOC obtains the variance value of a set of parallel-input pieces of pixel data (sixteen pieces of pixel data) where the pieces are denoted by Xi (i=1 to 16).

$$\Sigma Xi/16 = m$$

$$\Sigma (Xi-m)^2/16$$

As illustrated in FIG. 8, the variance average operation circuit AOC updates the variance average value by dividing the sum of the variance value of one set and the variance average value up to a previous set. Note that, to prevent a blank period where there is no display data, the variance average operation circuit AOC performs this updating only when a DE signal representing a display period is at a High level. By calculating the average in a display period, even in the case where pixel data where correlation in FIG. 7 is lost is temporarily input, correct correlation is output on an average in total.

The comparator circuit RFC determines the input format in a non-display period (DE signal is at a Low level). That is, the comparator circuit RFC compares a variance average value calculated at the last timing (last set) in a display period with a preset value (reference value PDV). In the case where the calculated variance average value is greater than the reference value PDV, it means that spreading is great. Thus, the comparator circuit RFC determines that the input format is the single scan format. In the case where the calculated variance average value is less than the reference value PDV, it means that spreading is small. Thus, the comparator circuit RFC determines that the input format is the block scan format. The comparator circuit RFC outputs the determination result as an input format signal IFS taking 1 or 0 to the pixel mapping circuit PMC. The pixel mapping circuit PMC performs the following processing.

That is, in the case where the input format signal IFS indicates the block scan format, the pixel data Qb1 to Qb16 (2073600 pixels per channel×16 channels) are sorted in accordance with the correspondence relationship in FIG. 4 (the relationship between the original image and pixel data of each channel). The pixel data Qc1 to Qc4, which correspond to the upper left-hand area in the case where the upper side of the SHV image is divided into left and right portions and the lower side thereof is divided into left and right portions (dividing the SHV image into four portions), are output to the display control substrate DC1; the pixel data Qc5 to Qc8 corresponding to the upper right-hand area of the SHV image are output to the display control substrate DC2; the pixel data Qc9 to Qc12 corresponding to the lower left-hand area of the SHV image are output to the display control substrate DC3; and the pixel data Qc13 to Qc16 corresponding to the lower right-hand area of the SHV image are output to the display control substrate DC4.

Meanwhile, in the case where the input format signal IFS indicates the single scan format, the pixel data Qb1 to Qb4 (2073600 pixels per channel×4 channels) are sorted in accordance with the correspondence relationship in FIG. 5 (the relationship between the original image and pixel data of each channel) to obtain the pixel data Qc1 to Qc4 (corresponding to the upper left-hand area in the case where the upper side of the SHV image is divided into left and right portions and the lower side thereof is divided into left and right portions), and the pixel data Qc1 to Qc4 are output to the display control substrate DC1. The pixel data Qb5 to Qb8 (2073600 pixels per channel×4 channels) are sorted in accordance with the correspondence relationship in FIG. 5 to obtain the pixel data Qc5 to Qc8 (corresponding to the upper right-hand area of the SHV image), and the pixel data Qc5 to Qc8 are output to the display control substrate DC2. The pixel data Qb9 to Qb12

(2073600 pixels per channel×4 channels) are sorted in accordance with the correspondence relationship in FIG. 5 to obtain the pixel data Qc9 to Qc12 (corresponding to the lower left-hand area of the SHV image), and the pixel data Qc9 to Qc12 are output to the display control substrate DC3. The pixel data Qb13 to Qb16 (2073600 pixels per channel×4 channels) are sorted in accordance with the correspondence relationship in FIG. 5 to obtain the pixel data Qc13 to Qc16 (corresponding to the lower right-hand area of the SHV image), and the pixel data Qc13 to Qc16 are output to the display control substrate DC4.

According to the first embodiment, a display that can handle multiple input formats for transmitting an ultra high definition image can be realized. That is, the circuit of an input unit of a display can be made common in both input formats, and the circuit dimensions and cost can be reduced.

In addition, only one input format is necessary to be saved at an image recorder side, and the recording capacity of an HDD (hard disk) or the like can be saved. Also, there is an advantage that the user is not required to perform system setting while paying attention to the input format.

Second Embodiment

Although the comparator circuit RFC compares the variance average value, calculated at the last timing (last set) in a display period, with the reference value PDV in the first embodiment, the input format determination method is not limited thereto. For example, the comparator circuit RFC may monitor the variable average value, and may determine that the input format is the single scan format at a point at which the variable average value exceeds the reference value PDV.

Third Embodiment

Figure 9:
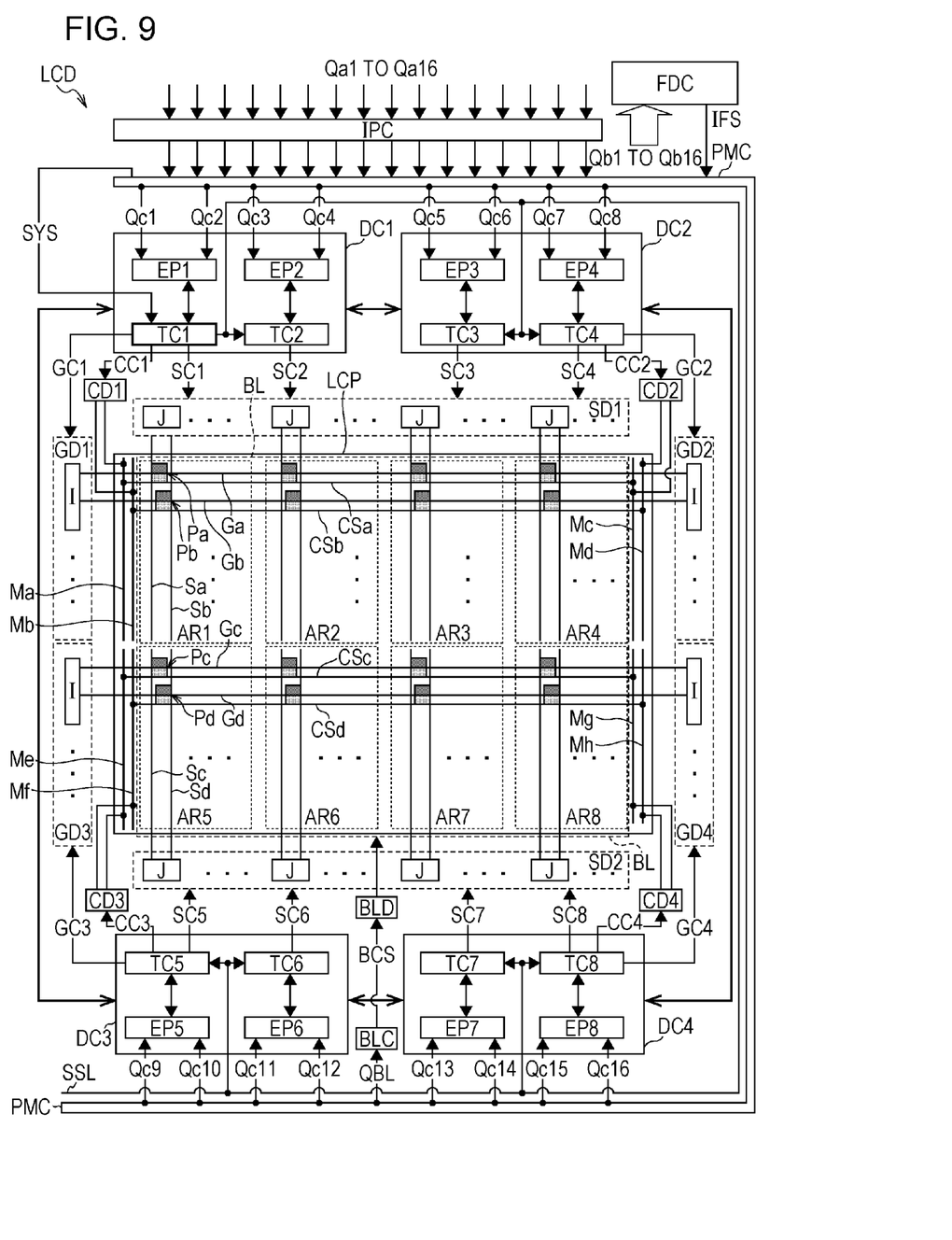
FIG. 9 is a schematic diagram illustrating the configuration of a liquid crystal display according to a third embodiment.

A liquid crystal display LCD according to the present embodiment corresponds to an image standard (such as super high vision with horizontal 7680 pixels×vertical 4320 pixels) with the number of pixels (8K4K) sixteen times greater than the number of pixels of full HD (horizontal 1920 pixels× vertical 1080 pixels). As illustrated in FIG. 9, the liquid crystal display LCD includes the input processing circuit IPC, the format determination circuit FDC, the pixel mapping circuit PMC, the four display control substrates (timing controller substrates) DC1 to DC4, a liquid crystal panel LCP, four gate drivers GD1 to GD4, two source drivers SD1 and SD2, four CS drivers CD1 to CD4, three power supply devices (not illustrated) connected to different commercial power sources, a power controller (not illustrated), a backlight BL, a backlight driver BLD, and a backlight controller BLC.

The input processing circuit IPC performs the earlier-described processing and outputs the image signals Qb1 to Qb16 to the pixel mapping circuit PMC.

The format determination circuit FDC determines whether the image signals Qb1 to Qb16 are in the block scan format or the single scan format, and outputs the input format signal IFS to the pixel mapping circuit PMC. The pixel mapping circuit PMC performs pixel mapping in accordance with the input format signal IFS. Note that it may be possible to add information (auxiliary data) enabling recognition of the block scan format or the single scan format to the input image signals Qa1 to Qa16 themselves.

Here, the display control substrate DC1 includes two image processing circuits EP1 and EP2 and two timing controllers TC1 and TC2; the display control substrate DC2 includes two image processing circuits EP3 and EP4 and two timing controllers TC3 and TC4; the display control substrate DC3 includes two image processing circuits EP5 and EP6 and two timing controllers TC5 and TC6; and the display control substrate DC4 includes two image processing circuits EP7 and EP8 and two timing controllers TC7 and TC8.

The pixel mapping circuit PMC divides an image signal (2K2K pixels) corresponding to the left half AR1 of a local area 1 (the upper left-hand area in the case where the liquid crystal panel LCP is divided into four upper/lower and left/right portions) into two signals (image signals Qc1 and Qc2 with full HD pixels) and outputs the two signals to the image processing circuit EP1 of the display control substrate DC1; divides an image signal (2K2K pixels) corresponding to the right half AR2 of the aforementioned local area 1 into two signals (image signals Qc3 and Qc4 with full HD pixels) and outputs the two signals to the image processing circuit EP2 of the display control substrate DC1; divides an image signal (2K2K pixels) corresponding to the left half AR3 of a local area 2 (the upper right-hand area in the case where the liquid crystal panel LCP is divided into four upper/lower and left/right portions) into two signals (image signals Qc5 and Qc6 with full HD pixels) and outputs the two signals to the image processing circuit EP3 of the display control substrate DC2; divides an image signal (2K2K pixels) corresponding to the right half AR4 of the aforementioned local area 2 into two signals (image signals Qc7 and Qc8 with full HD pixels) and outputs the two signals to the image processing circuit EP4 of the display control substrate DC2; divides an image signal (2K2K pixels) corresponding to the left half AR5 of a local area 3 (the lower left-hand area in the case where the liquid crystal panel LCP is divided into four upper/lower and left/right portions) into two signals (image signals Qc9 and Qc10 with full HD pixels) and outputs the two signals to the image processing circuit EP5 of the display control substrate DC3; divides an image signal (2K2K pixels) corresponding to the right half AR6 of the aforementioned local area 3 into two signals (image signals Qc11 and Qc12 with full HD pixels) and outputs the two signals to the image processing circuit EP6 of the display control substrate DC3; divides an image signal (2K2K pixels) corresponding to the left half AR7 of a local area 4 (the lower right-hand area in the case where the liquid crystal panel LCP is divided into four upper/lower and left/right portions) into two signals (image signals Qc13 and Qc14 with full HD pixels) and outputs the two signals to the image processing circuit EP7 of the display control substrate DC4; and divides an image signal (2K2K pixels) corresponding to the right half AR8 of the aforementioned local area 4 into two signals (image signals Qc15 and Qc16 with full HD pixels) and outputs the two signals to the image processing circuit EP8 of the display control substrate DC4.

Further, the pixel mapping circuit PMC outputs a sync signal SYS (vertical sync signal, horizontal sync signal, clock signal, data enable signal, etc.) to the timing controller TC1 of the display control substrate DC1. Upon receipt of this sync signal SYS, the timing controller TC1 transmits the sync signal SYS to an inter-substrate shared line SSL connected to the display control substrates DC1 to DC4.

Upon receipt of the sync signal SYS from the pixel mapping circuit PMC, the timing controller TC1 cooperates with the image processing circuit EP1 to perform image processing such as grayscale conversion processing of the image signals Qc1 and Qc2, thereafter outputs a source control signal SC1 to a source driver substrate (not illustrated) corresponding to AR1, outputs a gate control signal GC1 to a gate driver substrate (not illustrated) of the gate driver GD1, and outputs a CS control signal CC1 to the CS driver CD1.

Upon receipt of the sync signal SYS transmitted from the timing controller TC1 via the inter-substrate shared line SSL, the timing controller TC2 cooperates with the image processing circuit EP2 to perform the aforementioned processing of the image signals Qc3 and Qc4, and thereafter outputs a source control signal SC2 to a source driver substrate (not illustrated) corresponding to AR2.

Upon receipt of the sync signal SYS transmitted from the timing controller TC1 via the inter-substrate shared line SSL, the timing controller TC3 cooperates with the image processing circuit EP3 to perform the aforementioned processing of the image signals Qc5 and Qc6, and thereafter outputs a source control signal SC3 to a source driver substrate (not illustrated) corresponding to AR3.

Upon receipt of the sync signal SYS transmitted from the timing controller TC1 via the inter-substrate shared line SSL, the timing controller TC4 cooperates with the image processing circuit EP4 to perform the aforementioned processing of the image signals Qc7 and Qc8, thereafter outputs a source control signal SC4 to a source driver substrate (not illustrated) corresponding to AR4, outputs a gate control signal GC2 to a gate driver substrate (not illustrated) of the gate driver GD2, and outputs a CS control circuit CC2 to the CS driver CD2.

Upon receipt of the sync signal SYS transmitted from the timing controller TC1 via the inter-substrate shared line SSL, the timing controller TC5 cooperates with the image processing circuit EP5 to perform the aforementioned processing of the image signals Qc9 and Qc10, thereafter outputs a source control signal SC5 to a source driver substrate (not illustrated) corresponding to AR5, outputs a gate control signal GC3 to a gate driver substrate (not illustrated) of the gate driver GD3, and outputs a CS control circuit CC3 to the CS driver CD3.

Upon receipt of the sync signal SYS transmitted from the timing controller TC1 via the inter-substrate shared line SSL, the timing controller TC6 cooperates with the image processing circuit EP6 to perform the aforementioned processing of the image signals Qc11 and Qc12, and thereafter outputs a source control signal SC6 to a source driver substrate (not illustrated) corresponding to AR6.

Upon receipt of the sync signal SYS transmitted from the timing controller TC1 via the inter-substrate shared line SSL, the timing controller TC7 cooperates with the image processing circuit EP7 to perform the aforementioned processing of the image signals Qc13 and Qc14, and thereafter outputs a source control signal SC7 to a source driver substrate (not illustrated) corresponding to AR7.

Upon receipt of the sync signal SYS transmitted from the timing controller TC1 via the inter-substrate shared line SSL, the timing controller TC8 cooperates with the image processing circuit EP8 to perform the aforementioned processing of the image signals Qc15 and Qc16, thereafter outputs a source control signal SC8 to a source driver substrate (not illustrated) corresponding to AR8, outputs a gate control signal GC4 to a gate driver substrate (not illustrated) of the gate driver GD4, and outputs a CS control circuit CC4 to the CS driver CD4.

Note that the source control signals SC1 to SC8 each include a data signal, a data latch signal, a source start pulse, and a source clock, and the gate control signals GC1 to GC4 each include a gate start pulse and a gate clock.

The display control substrates DC1 to DC4 enable synchronization of their operations by exchanging or sharing various signals among the display control substrates DC1 to DC4. Specifically, the display control substrate DC1, acting as a master, sends a RDY (preparation is complete) signal to the display control substrate DC2, which is a slave. Upon receipt of the RDY signal, the display control substrate DC2 sends the RDY signal to the display control substrate DC3, which is a slave, upon completion of preparation. Upon receipt of the RDY signal, the display control substrate DC3 sends the RDY signal to the display control substrate DC4, which is a slave, upon completion of preparation. Upon receipt of the RDY signal, the display control substrate DC4 sends the RDY signal back to the display control substrate DC1 upon completion of preparation. In response to the fact that the RDY signal has been sent back, the display control substrate DC1 transmits an operation start (SRST) signal to the display control substrates DC2 to DC4 at the same time via the inter-substrate shared line SSL. After the operation start (SRST) signal has been transmitted, the timing controller TC1 of the display control substrate DC1 transmits the aforementioned sync signal SYS, received from the pixel mapping circuit PMC, to the timing controllers TC2 to TC8 at the same time via the inter-substrate shared line SSL.

The liquid crystal panel LCP includes an active matrix substrate, a liquid crystal layer (not illustrated), and an opposed substrate (not illustrated). The active matrix substrate is provided with a plurality of pixel electrodes (not illustrated), a plurality of TFTs (thin film transistors, not illustrated), scanning signal lines Ga to Gd extending in the row direction (direction along the long side of the panel), a plurality of data signal lines Sa to Sd extending in the column direction, holding capacitance wires (CS wires) CSa to CSd extending in the row direction, and CS main wires Ma to Mh extending in the column direction. The opposed substrate is provided with a common electrode (not illustrated), color filters, and a black matrix (not illustrated).

In addition, the gate driver GD1 is provided along one of two short sides of the upper half of the liquid crystal panel LCP and includes a plurality of gate driver chips I arranged in the column direction. The vertical driver GD2 is provided along the other one of the two short sides of the upper half of the liquid crystal panel LCP and includes a plurality of gate driver chips I arranged in the column direction. In addition, the gate driver GD3 is provided along one of two short sides of the lower half of the liquid crystal panel LCP and includes a plurality of gate driver chips I arranged in the column direction. The vertical driver GD4 is provided along the other one of the two short sides of the lower half of the liquid crystal panel LCP and includes a plurality of gate driver chips I arranged in the column direction. The individual scanning signal lines provided in the upper half of the panel are driven by the gate drivers GD1 and GD2, and the individual scanning signal lines provided in the lower half of the panel are driven by the gate drivers GD3 and GD4. That is, one scanning signal line is connected to two gate drivers arranged at two sides of the scanning signal line, and scanning (pulse) signals in the same phase are supplied from the two gate drivers to the scanning signal line. In this way, variation of signal shape sharpness (the degree of signal shape sharpness changes depending on the position in the row direction) caused by CR (time constant) of the scanning signal line can be suppressed.

The source driver SD1 is provided along one long side of the upper half of the liquid crystal panel LCP, and includes 48 source driver chips J arranged in the row direction (the number of output terminals of one source driver chip is 960) and not-illustrated four source driver substrates (twelve source driver chips J are mounted on one source driver substrate). Meanwhile, the source driver SD2 is provided along one long side of the lower half of the liquid crystal panel LCP, and includes 48 source driver chips J arranged in the row direction (the number of output terminals of one source driver chip is 960) and not-illustrated four source driver substrates (twelve source driver chips J are mounted on one source driver substrate). The individual data signal lines provided in the upper half of the panel are driven by the source driver SD1, and the individual data signal lines provided in the lower half of the panel are driven by the source driver SD2. For example, a data signal line Sa is driven by the source driver SD1, and a data signal line Sc is driven by the source driver SD2.

The liquid crystal panel LCP has a so-called up-down divided double source structure (the structure with four data signal lines per pixel column, capable of concurrently selecting four scanning signal lines), in which two data signal lines are provided corresponding to the upper half of one pixel column (a first area, the upstream side of the panel) and two data signal lines are provided corresponding to the lower half of the pixel column (a second area, the downstream side of the panel), and is capable of performing quad-speed drive. Further, the liquid crystal panel LCP uses a so-called multi-pixel system that has at least two pixel electrodes per pixel, and viewing angle characteristics can be enhanced by a bright area and a dark area formed inside one pixel.

Note that the number of data signal lines provided in the upper half of the panel is at least 7680 (pixels)×3 (primary colors)×2 (double sources)=46080; the number of scanning signal lines provided in the upper half of the panel is at least 2160; the number of holding capacitance wires provided in the upper half of the panel is at least 2160; the number of data signal lines provided in the lower half of the panel is at least 46080; the number of scanning signal lines provided in the lower half of the panel is at least 2160; and the number of holding capacitance wires provided in the lower half of the panel is at least 2160.

As described above, the present image signal processing apparatus is an image signal processing apparatus capable of receiving, as inputs, images transmitted in first and second formats, the first format being a format that divides an original image into n areas (n is an integer greater than or equal to 2) and transmits the n area images on first to n-th channels, and the second format being a format that divides an original image into n images (n is an integer greater than or equal to 2) with definition lower than the original image and transmits the n images on first to n-th channels. The image signal processing apparatus includes a determination circuit that determines the first and second formats on the basis of correlation among a plurality of pieces of pixel data input in parallel with one another (concurrently) from the first to n-th channels, and a mapping circuit that sorts the plurality of pieces of pixel data in accordance with the determination result obtained by the determination circuit.

According to the above-described configuration, an image signal processing apparatus that can handle two formats that divide an original image into n images and transmit the n images on n channels can be realized.

In the present image signal processing apparatus, the determination circuit may be configured to determine the first and second formats by using the variance of the plurality of pieces of pixel data.

In the present image signal processing apparatus, the plurality of pieces of pixel data input in parallel with one another to the first to n-th channels may sequentially form a set, and the determination circuit may be configured to determine the first and second formats by using a variance corresponding to each of a plurality of sets.

In the present image signal processing apparatus, the determination circuit may be configured to regard the result obtained by dividing the sum of the variance value of a first set and the variance value of a second set by 2 as an average variance value up to the second set, and from a third set onward, the result obtained by dividing the sum of the average variance value up to a previous set and the variance value of a present set by 2 as an average variance value up to the present set; and, in the case where the average variance value up to an N-th set is less than or equal to a reference value, the determination circuit may be configured to determine that the format is the second format.

In the present image signal processing apparatus, each of the n images and the n area images may also be configured to include the same number of pixels as an image standard of high definition television broadcasting.

In the present image signal processing apparatus, the result obtained by dividing the sum of the variance value of a first set and the variance value of a second set by 2 may be regarded as an average variance value up to the second set, and from a third set onward, the result obtained by dividing the sum of the average variance value up to a previous set and the variance value of a present set by 2 may be regarded as an average variance value up to the present set; and, at a point at which a set whose average variance value exceeds a reference value appears, it may be determined that the format is the first format.

The present image signal processing apparatus is configured to determine, in which a first format is a format that divides an original image into n areas (n is an integer greater than or equal to 2) and transmits the n area images as image signals on first to n-th channels, and a second format is a format that divides an original image into n images (n is an integer greater than or equal to 2) with definition lower than the original image and transmits the n images as image signals on first to n-th channels, the first and second formats from correlation among the image signals on the first to n-th channels and to process the image signals on the first to n-th channels in accordance with the determination result.

The present liquid crystal display includes the above-described image signal processing apparatus.

The present invention is not limited to the above-described embodiments, and the embodiments of the present invention encompass configurations obtained by appropriately modifying or combining the above-described embodiments on the basis of publicly known technology or general technical knowledge.

INDUSTRIAL APPLICABILITY

The present invention is suitable for, for example, an ultra high definition liquid crystal display.

REFERENCE SIGNS LIST

DP display device
LCD liquid crystal display
LCP liquid crystal panel
TC1 to TC8 timing controllers
DC1 to DC4 display control substrates
PMC pixel mapping circuit
FDC format determination circuit
DOC variance operation circuit
AOC variance average operation circuit
RFC comparator circuit
Pa to Pd pixels
Ga to Gd scanning signal lines
Sa to Sd data signal lines
AR1 to AR8 divided display areas (in liquid crystal panel)

The invention claimed is:

1. An image signal processing apparatus capable of receiving, as inputs, images transmitted in first and second formats, the first format being a format that divides an original image into n areas (n is an integer greater than or equal to 2) and transmits the n area images on first to n-th channels, and the second format being a format that divides an original image into n images (n is an integer greater than or equal to 2) with definition lower than the original image and transmits the n images on first to n-th channels, comprising:
- a determination circuit that determines the first and second formats on the basis of correlation among a plurality of pieces of pixel data input in parallel with one another from the first to n-th channels; and
- a mapping circuit that sorts the plurality of pieces of pixel data in accordance with the determination result obtained by the determination circuit.

2. The image signal processing apparatus according to claim 1, wherein the determination circuit determines the first and second formats by using the variance of the plurality of pieces of pixel data.

3. The image signal processing apparatus according to claim 1, wherein the plurality of pieces of pixel data input in parallel with one another to the first to n-th channels sequentially form a set, and the determination circuit determines the first and second formats by using a variance corresponding to each of a plurality of sets.

4. The image signal processing apparatus according to claim 3, wherein the determination circuit regards the result obtained by dividing the sum of the variance value of a first set and the variance value of a second set by 2 as an average variance value up to the second set, and from a third set onward, the result obtained by dividing the sum of the average variance value up to a previous set and the variance value of a present set by 2 as an average variance value up to the present set; and, in the case where the average variance value up to an N-th set is less than or equal to a reference value, the determination circuit determines that the format is the second format.

5. The image signal processing apparatus according to claim 1, wherein the n images and the n area images each include the same number of pixels as an image standard of high definition television broadcasting.

6. The image signal processing apparatus according to claim 3, wherein the result obtained by dividing the sum of the variance value of a first set and the variance value of a second set by 2 is regarded as an average variance value up to the second set, and from a third set onward, the result obtained by dividing the sum of the average variance value up to a previous set and the variance value of a present set by 2 is regarded as an average variance value up to the present set, and,
- at a point at which a set whose average variance value exceeds a reference value appears, it is determined that the format is the first format.

7. An image signal processing apparatus that determines, in which a first format is a format that divides an original image into n areas (n is an integer greater than or equal to 2) and transmits the n area images as image signals on first to n-th channels, and a second format is a format that divides an original image into n images (n is an integer greater than or equal to 2) with definition lower than the original image and transmits the n images as image signals on first to n-th channels, the first and second formats from correlation among the image signals on the first to n-th channels, and processes the image signals on the first to n-th channels in accordance with the determination result.

8. A liquid crystal display comprising the image signal processing apparatus according to claim 1.

* * * * *